US005137500A

United States Patent [19]
Lhotak

[11] Patent Number: 5,137,500
[45] Date of Patent: Aug. 11, 1992

[54] SPROCKET CONVERSION KIT FOR GARAGE DOOR OPENER

[75] Inventor: Roger W. Lhotak, Elburn, Ill.

[73] Assignee: The Chamberlain Group, Inc., Elmhurst, Ill.

[21] Appl. No.: 704,054

[22] Filed: May 22, 1991

[51] Int. Cl.[5] .......... F16H 7/00

[52] U.S. Cl. .......... 474/152

[58] Field of Search .......... 474/152, 165, 158–160, 474/140; 49/199, 360

[56] References Cited

U.S. PATENT DOCUMENTS

| | | | |
|---|---|---|---|
| 601,990 | 4/1889 | Suter . | |
| 2,128,425 | 8/1938 | Martelli | 74/243 |
| 2,451,690 | 10/1948 | Oehler | 74/243 |
| 3,082,637 | 3/1963 | Paxton | 74/243 |
| 3,321,040 | 5/1967 | Kouzuki | 180/33 |
| 3,477,303 | 11/1969 | Brilando | 74/243 |
| 4,231,191 | 11/1980 | Ellmore | 49/360 X |
| 4,313,281 | 2/1982 | Richmond | 49/360 X |
| 4,794,731 | 1/1989 | Willmott et al. | 49/199 |

*Primary Examiner*—Thuy M. Bui
*Attorney, Agent, or Firm*—Fitch, Even, Tabin & Flannery

[57] ABSTRACT

A sprocket conversion kit for a garage door opener which includes a drive plate detachably mountable on a high speed output drive sprocket to provide an alternative low speed sprocket drive for endless chain belt drive. The drive plate has a shallow recess to receive the high speed sprocket with openings formed to provide engagement between the high speed sprocket teeth and the drive plate.

19 Claims, 2 Drawing Sheets

SPROCKET CONVERSION KIT FOR GARAGE DOOR OPENER

BACKGROUND OF THE INVENTION

1. Field of the Invention

The invention relates generally to garage door openers and specifically to a kit for modifying the drive sprocket in a garage door opener to convert the drive from a high speed drive to a low speed drive.

In the field of garage door openers, there is an interest in providing an opener which will be suitable for as many different types of existing garage doors as is practical and economically feasible. The garage doors for which potential customers may purchase automatic openers differ considerably in the size and weight of the doors and the power required to open them because of their manner of opening or the manner in which the weight of the door is counterbalanced. In attempting to increase the versatility of a garage door opener and, therefore, broaden the market for it, it has been known in the art to provide an opener with means for varying the speed with which the door is opened and closed and, therefore, the power available from a given motor to accomplish the opening and closing. In other words, if the door is opened slowly, the instantaneous force available is greater than if the door is opened more rapidly. This permits increasing the versatility of a garage door opener by merely providing the speed change without having to provide motors having different amounts of power available for opening and closing the door.

2. Description of the Prior Art

One example of a patent disclosing a constant speed motor with means for varying the output drive speed is a U.S. Pat. No. 4,794,731, to Willmott et. al, which is assigned to the same assignee as the present application. The one-piece garage door shown in the '731 patent may require more power to lift than is required for garage doors having multiple hingeably connected panels which slide upwardly on rollers received in two L-shaped channels. In addition, it has been found that opening a one-piece garage door rapidly often causes jerking or vibrations which tend to be destructive of the drive train for opening the door. This condition can be eliminated by opening the one-piece door at a slower rate than is used for the multiple, hinged panel door. As a means of varying the speed of raising and lowering the door, a garage door opener of the '731 patent utilizes a pair of sprockets, one having eight teeth and the other having six teeth, which may be selectively used to drive the continuous or endless chain loop which drives the lever system to raise and lower the garage door. In order to accommodate the use of either of the sprockets available in the '731 patent, there is provided a reversible idler which permits the installer of the door opener to select the idler position which is aligned with one or the other of the two drive sprockets.

One of the problems associated with the garage door opener of the '731 patent is that the dual sprockets are costly and must be included with each and every model sold. Since the portion of the consumers desiring the low speed sprocket for use on the one-piece garage door is relatively small as compared to those who have the sectioned garage doors and desire to use the high speed sprocket, there is an unnecessary premium in providing the extra sprocket with many of the garage door openers made in accordance with the '731 patent.

Accordingly, it would be desirable to eliminate this built-in premium involved in packing the dual sprocket with every garage door opener and instead provide an accessory kit for the consumer who wishes the low speed drive. This kit could be purchased separately to adapt the garage door opener to the low speed sprocket for those consumers who require that feature. It is important to note that the power delivered by the motor to the opener mechanism is on the order cf one-half to three-quarters of a horsepower and that it is delivered through the drive sprocket which engages the continuous chain as discussed above. Accordingly, it is important that the sprocket be keyed or otherwise attached rigidly to the output shaft so that there will be no slippage between the output shaft and the sprocket engaged with the endless chain. It is further noted that the lesser number of consumers require the slow speed sprocket so the conversion kit must include the means of converting the high speed sprocket to the low speed sprocket which will have fewer teeth than the high speed sprocket.

There are examples in the art of multiple speed sprockets as commonly used in bicycles and other applications. In this connection the patents to Martelli U.S. Pat. No. 2,128,425, Oehler U.S. Pat. No. 2,451,690, Paxton U.S. Pat. No. 3,082,637, Brilando U.S. Pat. No. 3,477,303 and Kouzuki U.S. Pat. No. 3,321,040 are noted Also noted is the U.S. Pat. No. 601,990 to Suter which discloses a large sprocket which is formed with a recess which allows a smaller sprocket to nest within a recess. The smaller sprocket in the Suter patent is completely enclosed by the larger sprocket. There is no means provided to support the larger sprocket other than mounted on the smaller sprocket. None of the prior art disclosures cited above would be suitable for the conversion kit to adapt a high speed garage door opener to low speed operation.

SUMMARY OF THE INVENTION

This invention relates to a conversion kit for use at the output drive of a garage door opener to convert the drive between the output shaft of the power drive unit and the endless chain from a high speed drive to a low speed drive. This requires providing means for effectively reducing the number of gear teeth or sprocket teeth on the output shaft, as for example, from eight to six. A kit is provided including a drive plate which is readily assembled to the high speed sprocket of the garage door opener in a simple and effective manner. A low speed sprocket is fixed to and co-axial with the drive plate secured to the high speed sprocket and the low speed sprocket is displaced axially from the high speed sprocket which nests in the dish-shaped recess in the drive plate. The garage door opener includes means which would reposition the endless chain to engage the low speed sprocket rather than the high speed sprocket, as for example, a reversible idler gear.

Accordingly, it is an object of the present invention to provide a kit for adapting a garage door opener to convert from a high speed drive to low speed drive.

It is another object of the present invention to provide a conversion kit including a low speed sprocket which is adapted for mounting on the high speed sprocket of a garage door opener to drive the endless chain at a reduced speed.

It is a further object of the present invention to provide simple, inexpensive and easily installed conversion kit for modifying a garage door opener to provide relatively low drive chain speed by use of an adaptor which effectively reduces the number of teeth on the chain drive sprocket.

It is still a further object of the present invention to provide an improved sprocket adaptor including a dish-shaped drive plate which mounts in driving relation to a high speed sprocket and which supports a low speed sprocket axially spaced from and coaxial with said high speed sprocket.

Other objects and advantages of the invention will be readily apparent from the following description taken in conjunction with the accompanying drawings in which:

DESCRIPTION OF THE PREFERRED EMBODIMENT

Figure 1:
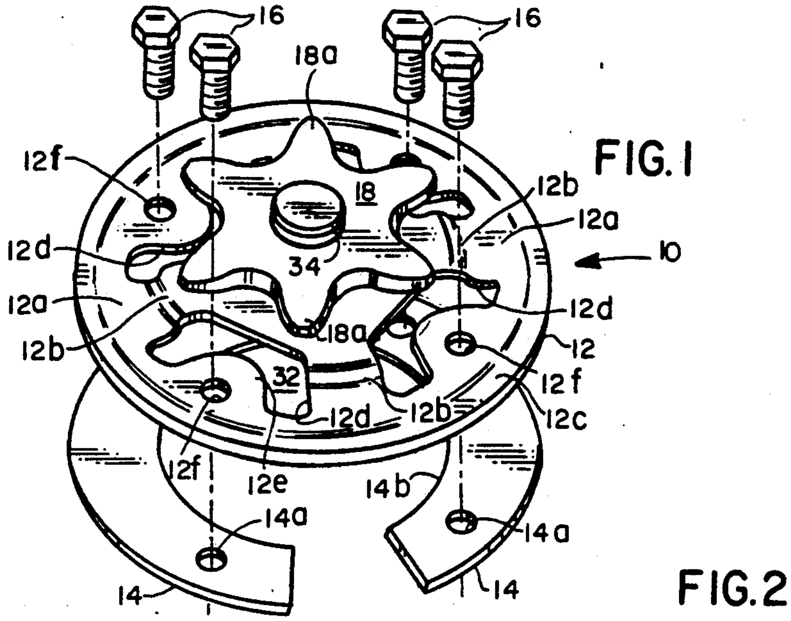
FIG. 1 is an exploded perspective view of a sprocket conversion kit embodying the invention.
Figure 2:
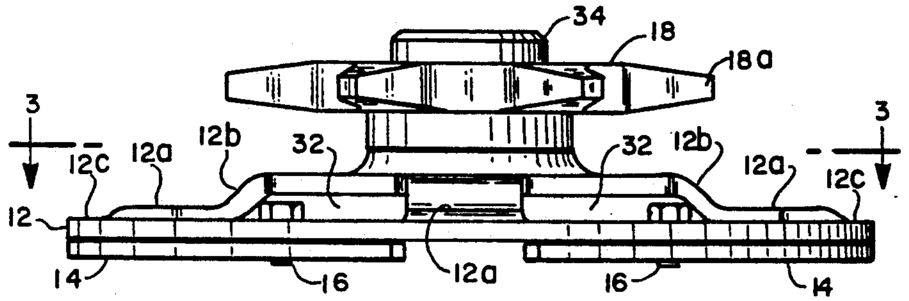
FIG. 2 is a side elevation view of the sprocket conversion kit of FIG. 1 with the parts shown in assembled position.

Referring to the drawings, there is shown in FIG. 1 a sprocket conversation kit which is designated generally by reference numeral 10. The purpose of the sprocket conversion kit 10 is to convert a drive sprocket such as might be employed in a garage door opener, from a high speed drive to a low speed drive or, in effect, provide an alternative output sprocket which would have a lesser number of teeth than the sprocket to which the conversion kit has been applied.

The conversion kit 10 includes a drive plate 12 which is adapted to be mounted on an output sprocket by means of a pair of assembly plates 14. Suitable fastening means including 4 bolts 16 are provided to secure the assembly plates 14 to the drive plate 12, to secure the kit 10 to the sprocket to be converted. The assembly plates are provided with threaded holes 14*a* in which the bolts 16 are received.

Figure 7:
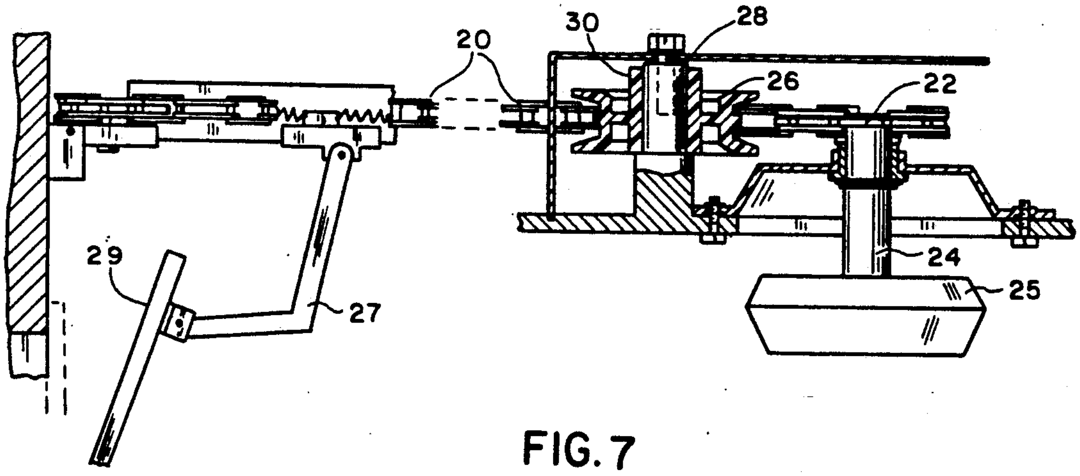
FIG. 7 is a schematic showing of a garage door opener drive with parts shown in section and including a high speed chain drive sprocket.

Mounted coaxially with the drive plate 12 is a low speed sprocket 18 which, in the disclosed embodiment, is formed with six sprocket teeth 18*a*. The sprocket teeth 18*a* are suitably designed and spaced to drivingly engage the links in an endless chain 20 of the kind typically used in connection with garage door openers as is shown in FIG. 7. The term "endless chain" as used herein is intended to include the various types of chain drives used on garage door openers, particularly those that utilize a section of chain having its ends connected by a length of cable to form a complete loop. These alternative chain constructions are known to those skilled in this art and are functionally equivalent to the true endless chain construction.

Figure 3:
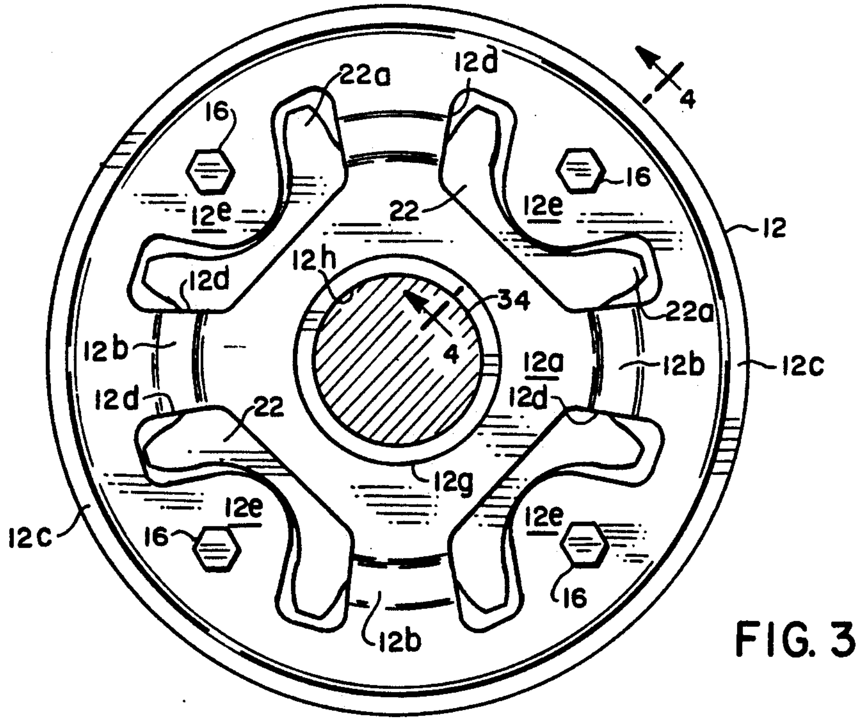
FIG. 3 is a sectional view taken on line 3—3 of FIG. 2 with the sprocket conversion kit shown assembled to a driving sprocket.

Shown in FIG. 3 and in FIG. 7 is a typical eight tooth sprocket 22, which is mounted on a drive shaft 24 of a motor drive on the drive unit 25 of a garage door opener. In a typical garage door opener, a portion of which is shown in FIG. 7, the motor-driven shaft 24 rotates about a vertical axis with the high speed sprocket 22 driving the endless chain 20. The chain 20 is disposed in a generally horizontal plane with a portion thereof connected to a lever mechanism 27 for raising and lowering a garage door 29. Upon driving the endless chain in one direction, it will close the garage door 29 and upon driving it in the other direction, it will open the door 29.

Figure 8:
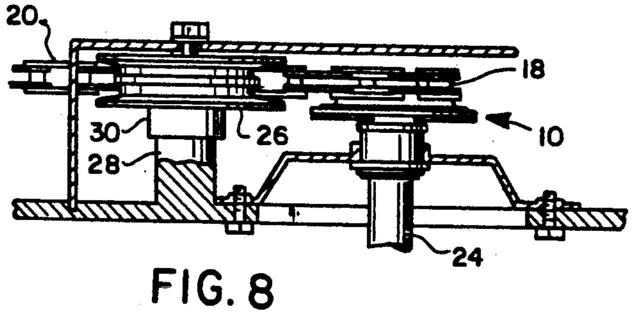
FIG. 8 is a garage door opener drive shown partially in section to which the conversion kit of the present invention has been added.

As was discussed above, there are many garage doors which require greater force than is available in the normal garage door opener. In addition, there are many types of one-piece garage doors that open more smoothly with less jerking and vibration when operated at a slower than normal speed. Accordingly, it may be necessary or desirable to provide the garage door opener drive with a slower speed output. It is known to provide the output shaft 24 of a garage door opener with two sprockets with varying numbers of teeth so that the user may select whichever one is most suitable for his particular installation. To adapt the endless chain 20 to be driven by either of two axially spaced sprockets, it is taught in U.S. Pat. No. 4,794,731 to Willmott et al. to provide a reversible idler pulley 26, as shown in FIGS. 7 and 8. The idler pulley 26 is received on a stub shaft 28 and includes an offset hub or journal portion 30, which mounts the idler pulley 26 for rotation on the stub shaft 28.

As may be easily understood from comparing FIGS. 7 and 8, the idler pulley occupies one position when mounted with an offset hub 30 projecting from the upper face, as shown in FIG. 7, and occupies a different or elevated position when positioned on the stub shaft 28 with the offset hub 30 projecting downwardly from the face of the idler pulley 26, as shown in FIG. 8. This permits the endless chain 20 to be aligned with either of two axially spaced output drive sprockets. Accordingly, when it is desired to modify the high speed sprocket 22, as shown in FIG. 7, to provide a lower speed sprocket, the conversion kit 10 may be employed to secure the low speed sprocket 18 in a position axially displaced above the high speed sprocket 22, as shown in FIG. 8.

The drive plate 12 is of a generally dish-shaped configuration having a generally flat bottom 12*a* interrupted by angled sidewalls 12*b* and an outer lip 12*c*. The dish-shaped configuration provides a downwardly facing recess 32 within which the high speed sprocket 22 may be received. As is evident from FIG. 4, the assembly plates 14 engage the lower face of the high speed sprocket 22 and sandwich the sprocket 22 between the drive plate 12 and the assembly plates 14.

Since it is necessary to transfer a substantial amount of power between the output drive shaft 24 and the endless chain 20, it is important that the sprocket driving the chain 20, whether it be a low speed or high speed sprocket, be securely keyed or attached on the end of the shaft 24. The high speed sprocket 22 is factory assembled to the shaft 24, and may be secured by a pin extending through aligned openings in the shaft 24 and the sprocket 22. The present invention provides a simple means of securing the low speed sprocket 18 of the assembly kit 10 to the output shaft 24. This objective is accomplished by providing the drive plate 12 with a plurality of U-shaped openings **12*d* formed in part in the angled walls 12*b* of the drive plate 12. The U-shaped openings 12*d* are defined in part by the inwardly projecting portions 12*e*, which are designed to extend into the root portions of the area between the teeth 22*a* formed on the high speed sprocket 22**.

Figure 4:
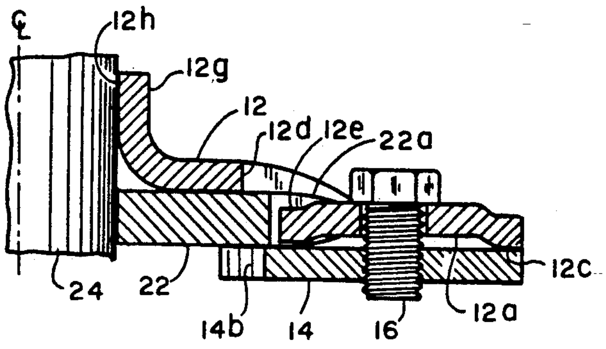
FIG. 4 is a sectional view taken on line 4—4 of FIG. 3.

As may best be seen in FIG. 4, the inward projections **12*e* project into the downwardly facing recess 32 and are therefore in the plane of the high speed sprocket 22 to assure full engagement with the area between the teeth 22*a*. The inward projections 12*e* are also formed with openings 12*f* which receive the fasteners 16 for threaded engagement with openings 14*a* in the assembly plates 14**.

As is best shown in FIG. 4, the assembly plates 14 engage the drive plate 12 at the peripheral lip **12*c*. Thus, the fasteners 16 in applying an upward pressure on the plates 14, as shown in FIG. 4, attain considerable added leverage in applying a force to the inner edges of the assembly plates 14 along an inner diameter 14*b***.

Figure 5:
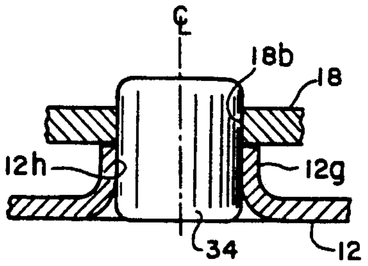
FIG. 5 is a fragmentary vertical section of the means of assembling the drive plate to the low speed sprocket.

In one preferred form of the conversion kit 10, the drive plate 12 is formed with an upwardly extending hub portion **12*g*, as best shown in FIG. 5. The hub portion 12*g* has a central bore 12*h* which snugly receives a shaft 34, upon which the low speed sprocket 18 is mounted so as to be coaxial with the drive plate 12. The sprocket 18 is formed with a central opening 18*b* in which the shaft 34 is received. The parts, including the drive plate 12, the shaft 34 and the sprocket 18**, are secured together in a unitary assembly preferably by brazing or resistance welding.

Figure 6:
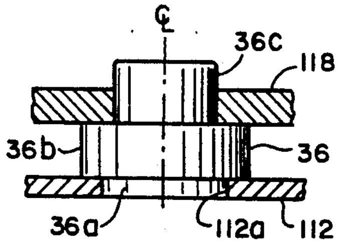
FIG. 6 is a fragmentary vertical section of an alternative embodiment of the means of assembling the drive plate to the low speed sprocket.

As an alternative approach to providing the offset mounting between a drive plate 112 and a low speed sprocket 118, there is shown in FIG. 6 a spacer 36 having its lower end formed with a reduced diameter portion **36*a* which is received in a circular opening 112*a* in drive plate 112. An intermediate shouldered portion 36*b* spaces the drive plate 112 and the low speed sprocket 118 a selected distance apart, the sprocket 118 being received upon a reduced diameter portion 36*c*. The drive plate 112, the spacer 36 and sprocket 118 of the embodiment of FIG. 6 may be assembled together by resistance welding or brazing in a known manner. The conversion kit 10 may be made of inexpensive cold rolled steel parts and the assembly by resistance welding or brazing is an economical manufacturing process. Accordingly, the cost of fabricating a conversion kit 10 is very low. By selling the conversion kit separately, the garage door opener with the high speed sprocket will have a lower manufactured cost and only those who require the low speed sprocket drive will be required to pay for the additional sprocket by purchasing the conversion kit. The assembly of the conversion kit 10 to the existing high speed sprocket 22 is simple and uncomplicated, involving only application of the bolts or fasteners 16 through the openings 12*f* in the drive plate into the threaded openings 14*a* in the assembly plates 14. The teeth of the high speed sprocket, when sandwiched between the drive plate and the assembly plate, engage the inward projections 12*e* which assures a good driving connection between the high speed sprocket 22 and the drive plate 12 sufficient to accommodate the substantial power delivered through the drive shaft 24 to the endless chain 20. By having the assembly plates 14 engage the drive plate 12 only at the outer periphery at the lip 12*c*, a clamping action is achieved by the assembly plates 14 on the high speed sprocket 22 as the bolts 16 are tightened in place to assure a secure assembly of the kit 10 to the high speed sprocket 22**. The present invention provides a simple and economical solution to the problem of providing a drive means for a garage door opener which may be readily adapted to the differing power or speed demands encountered in various installation situations.

Although the invention has been described with respect to several preferred embodiments, it is not to be so limited, as changes and modifications may be made therein which are within the scope of the invention as defined by the appended claims.

What is claimed is:

1. A dual speed sprocket comprising:

a high speed sprocket having a plurality of sprocket teeth and means for mounting said sprocket on an output shaft for rotation about a first axis, a drive plate having a central axis and having a dish-shaped central portion with a planar bottom portion surrounded by angled sidewalls defining a shallow recess, an annular peripheral lip on said drive plate extending outwardly from said central portion, a plurality of drive openings formed in said sidewalls each disposed an equal distance radially from said central axis of said drive plate, a low speed sprocket having fewer teeth than said high speed sprocket, a mounting hub supporting said low speed sprocket on said drive plate coaxially with said central axis and in spaced parallel relation to said bottom portion, and mounting means for detachably securing said drive plate to said high speed sprocket with said high speed sprocket received within said shallow recess formed in said drive plate with said high speed sprocket teeth extending into said drive openings to drivingly couple said drive plate and said high speed sprocket, said mounting means securing said drive plate and said low speed sprocket to said high speed sprocket with said central axis coaxial with said first axis.

2. A dual speed sprocket according to claim 1 wherein said mounting means comprises at least one annular segment having an outer periphery and an inner diameter and a plurality of fasteners extending through first holes in said drive plate and second holes in said annular segment, said first holes being disposed equidistant from said central axis, said second holes being aligned with said first holes and being disposed inwardly from the outer periphery of said segment whereby said outer periphery of said segment engages said drive plate peripheral lip and the portions of said annular segment adjacent to said inner diameter engage said high speed sprocket

3. A dual speed sprocket according to claim 2 wherein said drive openings are each U-shaped in configuration and are sized and disposed to receive two sprocket teeth of said high-speed sprocket.

4. A dual speed sprocket according to claim 3 wherein said first holes in said drive plate are each disposed between the legs of the U formed by one of said U-shaped drive openings.

5. A gear system for multiple speed driving of a garage door opener comprising:

a closed loop chain drive connected to a mechanism for opening and closing a garage door, a frame supporting a motor driving an output shaft, a dual speed sprocket supported on said output shaft for driving engagement with said closed loop chain, an idler to support said loop chain adjacent to said dual speed sprocket, said dual speed sprocket including a high speed sprocket mounted fixedly on one end of said output shaft, a drive plate having a dish-shaped portion providing a shallow recess to receive said high speed sprocket, said drive plate supporting a low speed sprocket which is coaxial with said high speed sprocket and displaced axially therefrom, and at least one assembly means detachably secured to said drive plate for securing said high speed sprocket within said shallow recess and for drivingly connecting said high speed and low speed sprockets.

6. A gear system as set forth in claim 5 wherein said drive plate includes cut-out portions in said dish-shaped portion of said plate, said high speed sprocket having sprocket teeth which extend into said cut-out portions to drivingly interconnect said drive plate and said high speed sprocket.

7. A gear system in accordance with claim 5 wherein said frame supports an idler shaft which is parallel to and spaced from said output shaft, said idler shaft journaling said idler in two alternative positions one of which aligns said idler with said high speed sprocket and the other of which aligns said idler with said low speed sprocket.

8. A gear system in accordance with claim 5 wherein said assembly means comprises a pair of arcuate assembly plates each having a center of curvature on the axis of said output shaft and being disposed diametrically opposite each other on opposite sides of said output shaft.

9. A gear system in accordance with claim 6 wherein said drive plate is formed with an annular peripheral lip extending outwardly from a dish-shaped portion which defines said shallow recess, said dish-shaped portion having a flat bottom surrounded by angled sidewalls, said cut-out portions being disposed in said angled sidewalls.

10. A gear system in accordance with claim 9 wherein said assembly means comprises at least one annular segment and a plurality of detachable fasteners extending through aligned openings in said annular segment and said drive plate, said annular segment having an outer bearing surface in engagement with said peripheral lip on said drive plate and an inner bearing surface in engagement with said high speed sprocket, said fasteners engaging said annular segment between said inner and outer bearing surfaces.

11. A gear system in accordance with claim 10 wherein said cut out portions are disposed in said angled sidewalls on said drive plate and each is generally U-shaped to receive a pair of teeth of said high speed sprocket, said fasteners extending through openings in said drive plate disposed between the legs of each said U-shaped cut-out portions.

12. A sprocket conversion kit for use in combination with the motor drive means of an electric garage door opener of the type having an endless chain drive connected between a motor output drive and a lever means for opening and closing a garage door, said motor output drive including a drive shaft mounting at its free end a high speed sprocket having sprocket teeth arranged in driving engagement with an endless chain, the kit comprising:

a drive plate having a central axis and a central portion with a planar bottom portion surrounded by sidewalls defining a shallow recess, an annular peripheral lip on said drive plate extending outwardly from said central portion, a low speed sprocket having fewer teeth than said high speed sprocket, a mounting hub supporting said low speed sprocket on said drive plate coaxially with said central axis and in spaced parallel relation to said bottom portion, and mounting means for detachably securing said drive plate to said high speed sprocket when said high speed sprocket is received within said shallow recess formed in said drive plate, said mounting means securing said drive plate and said low speed sprocket to said high speed sprocket with said central axis coaxial with said shaft axis.

13. A sprocket conversion kit according to claim 12 wherein said drive plate sidewalls define drive openings which receive said high speed sprocket teeth to drivingly couple said drive plate and said high speed sprocket.

14. A sprocket conversion kit according to claim 13 wherein said mounting means comprises at least one annular segment having an outer periphery and an inner diameter and a plurality of fasteners extending through first holes in said drive plate and second holes in said annular segment, said first holes being disposed in said central portion of said drive plate and equidistant from said central axis, said second holes being aligned with said first holes and being disposed inwardly from the outer periphery of said segment whereby said outer periphery of said segment engages said drive plate peripheral lip and the portions of said annular segment defining said inner diameter engage said high speed sprocket.

15. A sprocket conversion kit according to claim 14 wherein said drive openings are each U-shaped in configuration and are sized and disposed to receive two sprocket teeth of said high speed sprocket.

16. A sprocket conversion kit according to claim 14 wherein said mounting means comprises two annular segments each encompassing a central angle on the order of 150 degrees and having two of said second holes formed therein, said drive plate being provided with four of said first holes being spaced equidistant from each other, said annular segments when secured to said drive plate being disposed diametrically opposite each other with respect to said central axis.

17. A sprocket conversion kit according to claim 12 wherein said mounting hub comprises a stub shaft, said drive plate being formed to define a central bore aligned with said central axis, said low speed sprocket being formed with an opening aligned with said central axis, said stub shaft extending through said bore and said sprocket opening and being secured to said drive plate and low speed sprocket to support said drive plate and low speed sprocket.

18. A sprocket conversion kit according to claim 17 wherein said portion of said drive plate defining said central bore is formed with an upstanding cylindrical flange having a top edge which engages said low speed sprocket to space said low speed sprocket from said drive plate.

19. A sprocket conversion kit according to claim 17 wherein said stub shaft is formed with an enlarged central portion and end portions of reduced diameter, said central bore and said low speed sprocket openings receiving said reduced diameter end portions, said enlarged central portions defining spaced annular shoulders which engage said low speed sprocket and said drive plate to position said low speed sprocket and said drive plate in spaced parallel relation.

* * * * *

UNITED STATES PATENT AND TRADEMARK OFFICE
CERTIFICATE OF CORRECTION

PATENT NO. : 5,137,500

DATED : August 11, 1992

INVENTOR(S) : Lhotak, et al.

It is certified that error appears in the above-identified patent and that said Letters Patent is hereby corrected as shown below:

column 1, line 37, change "et. al," to --et al.--.

column 2, line 11, after "order" change "cf" to --of--.

column 2, line 19, change "require" to --requires--.

column 2, line 30, after "noted" insert --of interest--.

column 2, line 53, change "co-axial" to --coaxial--.

column 3, line 2, after "provide", insert --a--.

column 3, line 20, change "elevation" to --elevational--.

column 3, line 42, change "conversation" to --conversion--.

column 5, lines 10-11, insert a new paragraph.

column 5, lines 10-11, insert between "high speed sprocket 22" and "." --as best shown in FIG 4--.

UNITED STATES PATENT AND TRADEMARK OFFICE
CERTIFICATE OF CORRECTION

PATENT NO. : 5,137,500

DATED : August 11, 1992

INVENTOR(S) : Lhotak, et al.

It is certified that error appears in the above-identified patent and that said Letters Patent is hereby corrected as shown below:

IN THE CLAIMS:

column 6, line 58, after "sprocket" insert --.-- [a period].

column 7, line 59, change "cut out" to --cut-out--.

column 7, line 64, change "portions" to --portion--.

column 8, line 2, after "end" insert --and--.

Signed and Sealed this

Twelfth Day of October, 1993

Attest:

BRUCE LEHMAN

Attesting Officer

Commissioner of Patents and Trademarks